(12) United States Patent
Kling, III et al.

(10) Patent No.: US 6,950,775 B2
(45) Date of Patent: Sep. 27, 2005

(54) COORDINATE MEASURING SYSTEM AND FIELD-OF-VIEW INDICATORS THEREFOR

(75) Inventors: Michael J. Kling, III, Delafield, WI (US); Sanjay R. Shetty, Franklin, WI (US); Yinsong Li, Pewaukee, WI (US)

(73) Assignee: Snap-on Incorporated, Pleasant Prairie, WI (US)

( * ) Notice: Subject to any disclaimer, the term of this patent is extended or adjusted under 35 U.S.C. 154(b) by 0 days.

(21) Appl. No.: 10/724,651

(22) Filed: Dec. 1, 2003

(65) Prior Publication Data

US 2005/0119857 A1    Jun. 2, 2005

(51) Int. Cl.[7] ............................................. G06F 15/00
(52) U.S. Cl. ................................................... 702/150
(58) Field of Search ........................ 702/150; 324/247; 343/788, 787; 123/536; 356/319, 328; 359/894, 359/857; 250/231; 701/17, 223, 216; 378/54; 73/514, 862; 33/293, 288; 244/3; 707/17; 340/825; 280/735; 700/242; 180/273; 398/131; 342/144; 361/143

(56) References Cited

U.S. PATENT DOCUMENTS

| | | | |
|---|---|---|---|
| 4,385,833 A * | 5/1983 | Gardner ..................... 359/857 |
| 5,198,877 A | 3/1993 | Schulz | |
| 5,402,364 A | 3/1995 | Kitoh et al. | |
| 5,432,904 A | 7/1995 | Wong | |
| 5,515,613 A | 5/1996 | Hinson | |
| 5,969,756 A * | 10/1999 | Buckley et al. ............. 348/190 |
| 6,115,927 A * | 9/2000 | Hendrix ....................... 33/288 |
| 6,131,299 A | 10/2000 | Raab et al. | |
| 6,133,948 A | 10/2000 | Abbott et al. | |
| 6,141,104 A | 10/2000 | Schulz et al. | |
| 6,268,923 B1 | 7/2001 | Michniewicz et al. | |
| 6,389,158 B1 | 5/2002 | Pettersen et al. | |
| 6,442,416 B1 | 8/2002 | Schultz | |
| 6,497,134 B1 | 12/2002 | Faul et al. | |
| 2002/0093331 A1 * | 7/2002 | Rochelle ..................... 324/247 |
| 2002/0161533 A1 | 10/2002 | Uegaki | |
| 2003/0081952 A1 | 5/2003 | Geng | |

OTHER PUBLICATIONS

Image Guided Technologies Instruction Sheet for Wireless Probe, Prior to May 2003.

* cited by examiner

*Primary Examiner*—Bryan Bui
*Assistant Examiner*—Tung S. Lau
(74) *Attorney, Agent, or Firm*—Seyfarth Shaw LLP

(57) ABSTRACT

A system for measuring the relative locations of points on a vehicle includes plural electromagnetic radiation sources adapted to be fixed relative to the vehicle and plural electromagnetic radiation receivers, a processor for determining angles between each receiver and each source, a display device, and a processor program routine for monitoring each receiver and generating a graphical display indicating for each source and each receiver whether or not the source is in the field of view of the receiver. A hand-held probe may have at least one additional electromagnetic radiation source and an indicator to indicate whether or not the probe source is in the field of view of all receivers.

28 Claims, 8 Drawing Sheets

COORDINATE MEASURING SYSTEM AND FIELD-OF-VIEW INDICATORS THEREFOR

BACKGROUND

This application relates to measuring systems for objects and, in particular, for systems designed for making dimensional measurements on automotive vehicles for the purpose of collision damage repair. However, it will be appreciated that the principles described herein could have application to measurement of any type of object.

Various types of measuring devices have been used on vehicles, e.g., to attempt to determine how much a vehicle frame or body deviates from standard specifications in order to determine the amount of repair or straightening that may be needed. One such system is disclosed, e.g., in U.S. Pat. No. 6,115,927. That system utilizes a camera system for viewing and, thereby locating a hand-held probe. The system utilizes a dynamic reference frame to permit the system to accurately measure the three-dimensional coordinates of the probe, even if the camera is moved. The camera system consists of three individual camera modules or sensors on a bar. Each camera sensor cooperates with a processor to measure angles between the camera bar and electromagnetic radiation emitters or sources, such as LED's, on the dynamic reference frame and on the hand-held probe. From these angles, the measurement system calculates the three-dimensional coordinates of each emitter relative to the camera bar and, thereby, the position of the hand-held probe relative to the dynamic reference frame.

Each camera sensor must be able to see at least three emitters on the dynamic reference frame and at least two on the hand-held probe for the system to work. If any of the lines of sight between a camera sensor and an emitter is blocked, i.e., the emitter is not in the field of view of the camera sensor, the operator must diagnose the problem and fix it in order to enable optimal measurement readings. In this regard, the system provides a generic indication if a blockage exists between a camera sensor and a dynamic reference frame emitter, but there is no indication as to which components are blocked or how many. If there is a blockage of a hand-held probe emitter, an indicating signal appears on a display screen, but only after the operator attempts to take a reading by pressing the read button on the probe. There is no indication of a problem before attempting to take a reading, nor is there an indication as to which specific element or elements are blocked. It is known, in other fields, to provide an indicator on a probe to indicate whether or not the probe is in the field of view of a camera but, again, it does not provide the details of blockage in the event of plural emitter or sensor elements.

SUMMARY

There is disclosed herein an improved coordinate measuring system and field-of-view indicators therefor which avoid disadvantages of prior systems while affording additional structural and operating advantages.

The system provides to an operator information about the specific nature of blockages of lines of sight among plural emitters and sensor modules.

There is provided a system for measuring the relative locations of points on a vehicle, which system includes plural electromagnetic radiation sources adapted to be fixed relative to the vehicle and plural electromagnetic radiation receivers at a receiving location and a processor coupled to the sources and to the receivers and operating under control of a stored program for determining angles between each receiver and each source which is in the field of view of the receiver, the improvement comprising: a display device coupled to the processor, and the processor program including a routine for monitoring each receiver and generating on the display device a graphical display indicating for each source and each receiver whether or not the source is in the field of view of the receiver.

In an embodiment, at least one source is disposed on a hand-held probe having an indicator, the processor programming including a routine causing the indicator to operate in a first mode if the source is in the field of view of all of the receivers and in a second mode if a source is in the field of view of all but one of the receivers.

There is also disclosed a method of measuring the relative locations of points on a vehicle by determining angles between each of plural electromagnetic radiation receivers and each of plural electromagnetic radiation sources which is in the field of view of the receiver, the improvement comprising: monitoring each receiver to determine which sources are in its field of view, and providing an indication as to whether or not any source is outside the field of view of any receiver and, if so, identifying which source or sources and which receiver or receivers.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
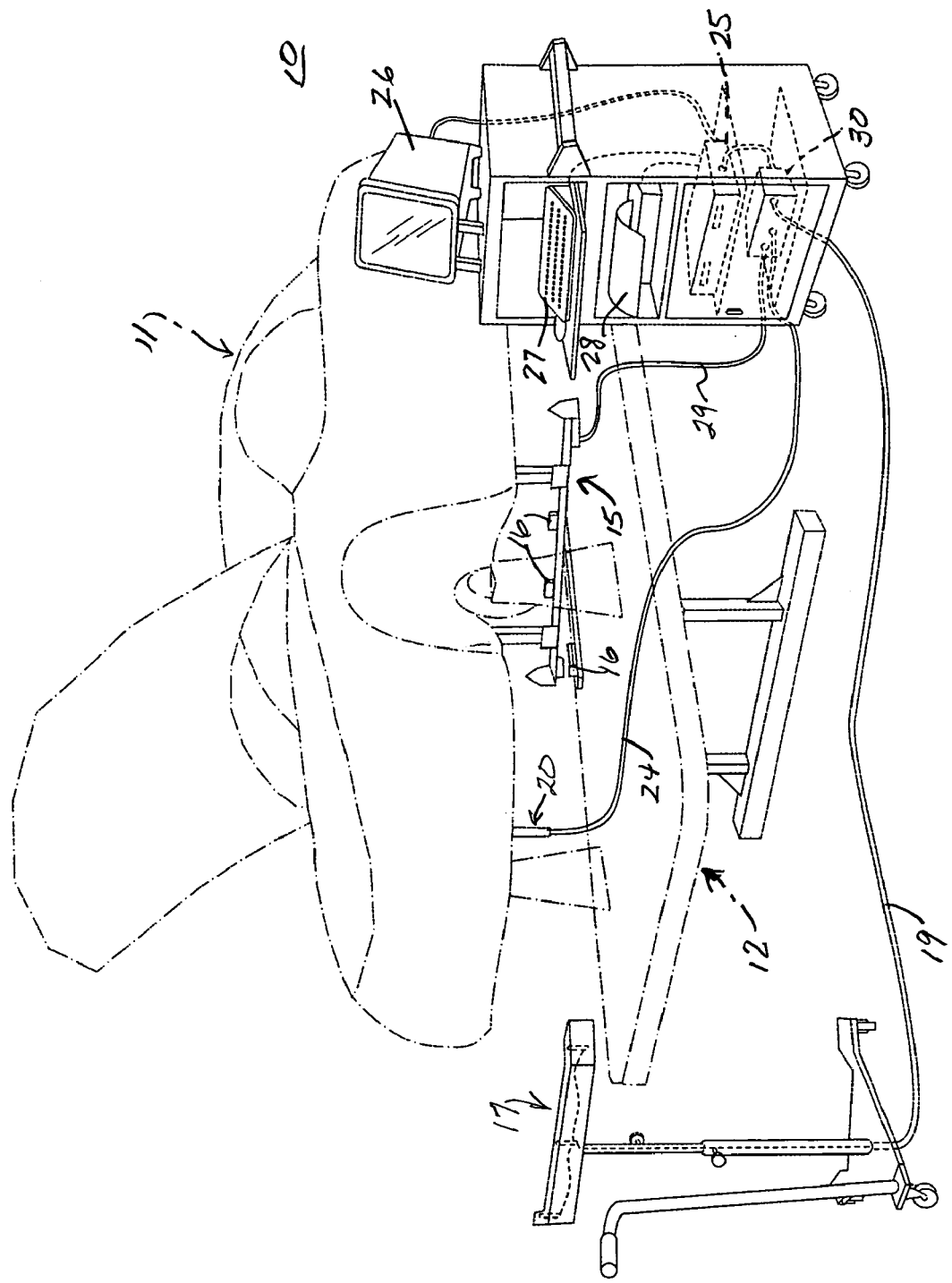
FIG. 1 is a perspective view of a coordinate measuring system.
Figure 3:
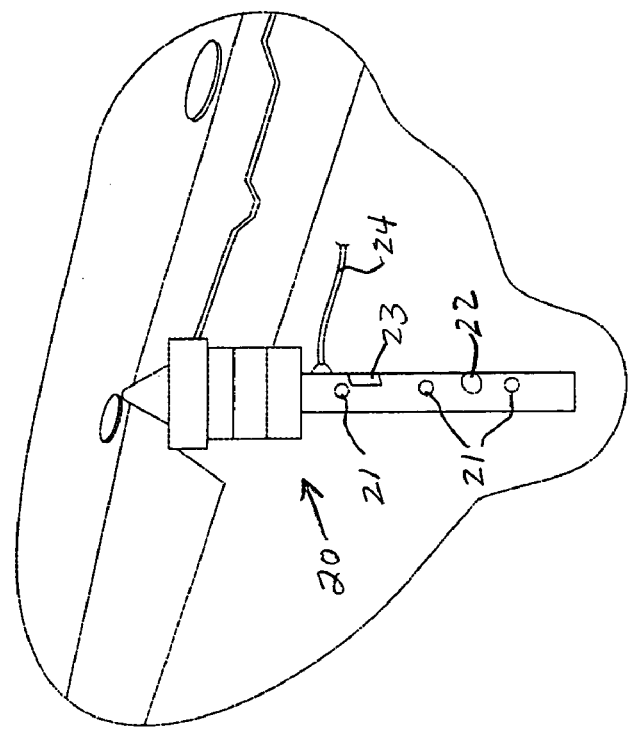
FIG. 3 is an enlarged perspective view of a hand-held probe of the system of FIG. 1.
Figure 2:
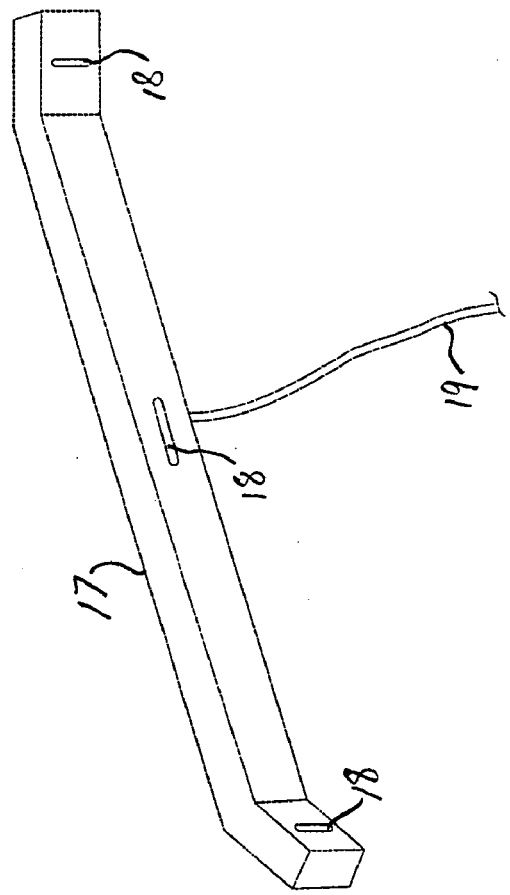
FIG. 2 is an enlarged perspective view of a camera bar of the system of FIG. 1.

Referring to FIGS. 1–3, there is illustrated a coordinate determining and measurement system, generally designated by the numeral 10, which may be generally similar to that disclosed in the aforementioned U.S. Pat. No. 6,115,927. The system 10 is operable to determine the three-dimensional coordinates of points on an associated object, such as a vehicle 11, which may be supported on a lift assembly 12, and to determine distances between selected ones of such points. The system 10 may include a dynamic reference frame 15, which may be generally T-shaped or cross-shaped, and which may have fixed thereon a plurality of spaced-apart electromagnetic radiation emitters or sources 16, which may be light sources, such as LED's. In the present embodiment, there are three such sources on the dynamic reference frame 15, with two respectively arranged along arms of a "T" and one arranged along the stem of the "T". In use, the frame 15 is fixed with respect to the associated vehicle 11. The system 10 also includes a bar 17, which may be mounted on a suitable support at a receiving location, and which has fixed thereon a plurality of spaced-apart electromagnetic radiation receivers, which may be in the nature of camera modules or sensors (see FIG. 2), such as charge coupled device (CCD) sensors. The receivers 18 may be connected by a cable 19 to other parts of the system 10, as will be explained more fully below.

The system 10 may also include a hand-held probe 20 (see FIG. 3), which may be manually held against selected points on the vehicle 11 for determining the three-dimensional coordinates of such points. The probe 20 carries thereon a plurality of spaced-apart electromagnetic radiation emitters or sources, which may be light sources, such as LED's, and may be three in number. The probe 20 also has associated therewith a visual indicator 22, which may be an LED, for a purpose to be explained more fully below, and a switch 23 which is manually operable by a user to activate a measurement or reading operation. When the switch 23 is activated, the system will determine the coordinates of the probe point and make appropriate measurements of the distances between that point and other relevant points, all in a known manner. The probe 20 may be coupled by a cable 24 to other parts of the system 10, as will be explained more fully below.

The system 10 may also include a host computer 25, which may be a PC, and may include a suitable display 26, such as a CRT display or other display of the type commonly used with PC's. The display 26 may form part of a user interface which may include a keyboard 27 (and/or mouse) and a printer 28 and, if desired, other peripheral devices.

Figure 4:
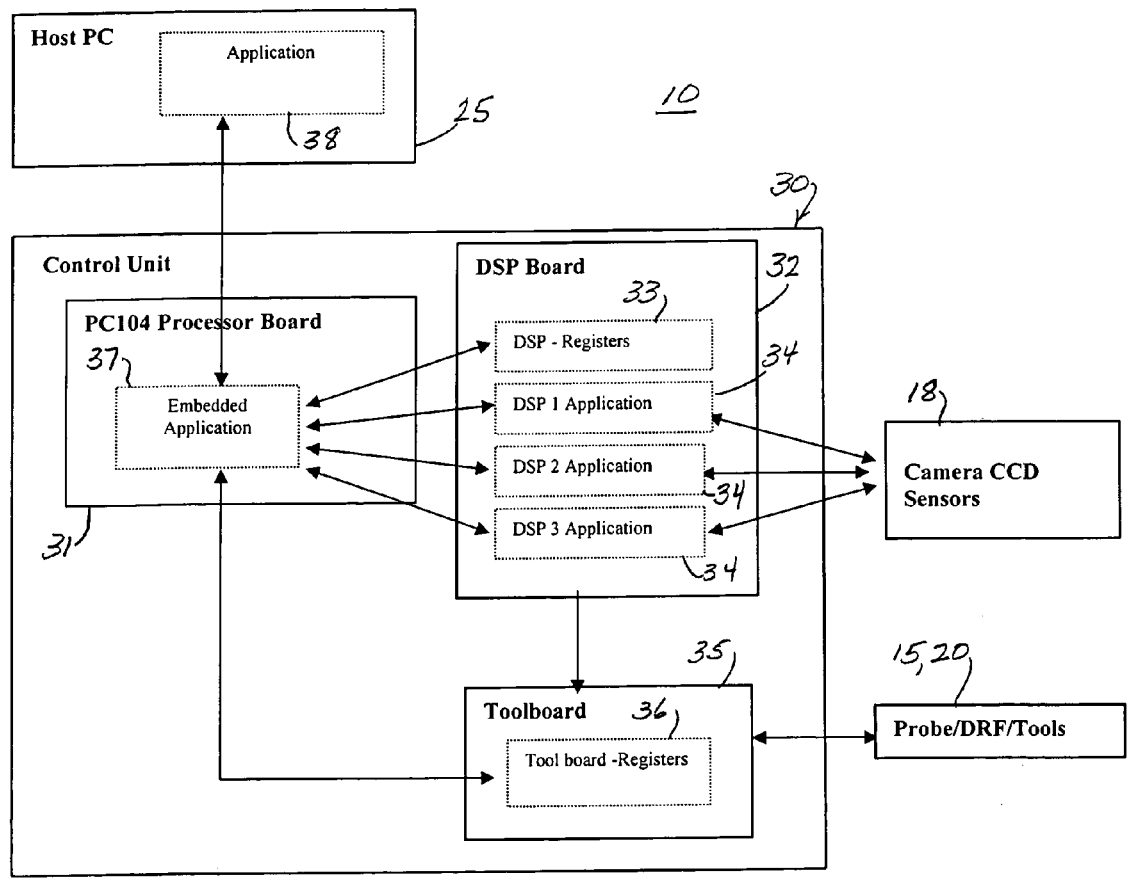
FIG. 4 is a functional blocked diagrammatic illustration of the system of FIG. 1.

Referring also to FIG. 4, the system 10 may include a control unit 30 which may be physically located adjacent to the computer 25 or remote therefrom. The control unit 30 includes a processor board 31 carrying a suitable processor operable under program control. The control unit 30 also includes a digital signal processing (DSP) board 32, which carries thereon memory defining DSP registers 33 and a processor controlled by a program running three DSP application routines 34, respectively corresponding to the receivers 18. The registers 33 and application routines 34 all communicate with the processor board 31, and the application routines 34 also respectively communicate with the receivers or camera sensors 18. The control unit 30 also includes a tool board 35 which is connected to the DSP board 32 and to the probe/DRF tools, i.e., the digital reference frame sources 16 and the probe sources 21, indicator 22 and switch 23, the tool board 35 carrying tool board registers 36 which are connected to the processor board 31, which runs embedded application software 37 which communicates with the tool board registers 36, the DSP registers 33 and the DSP application routines 34, as well as with host application software 38 at the host computer 25.

Figure 5:
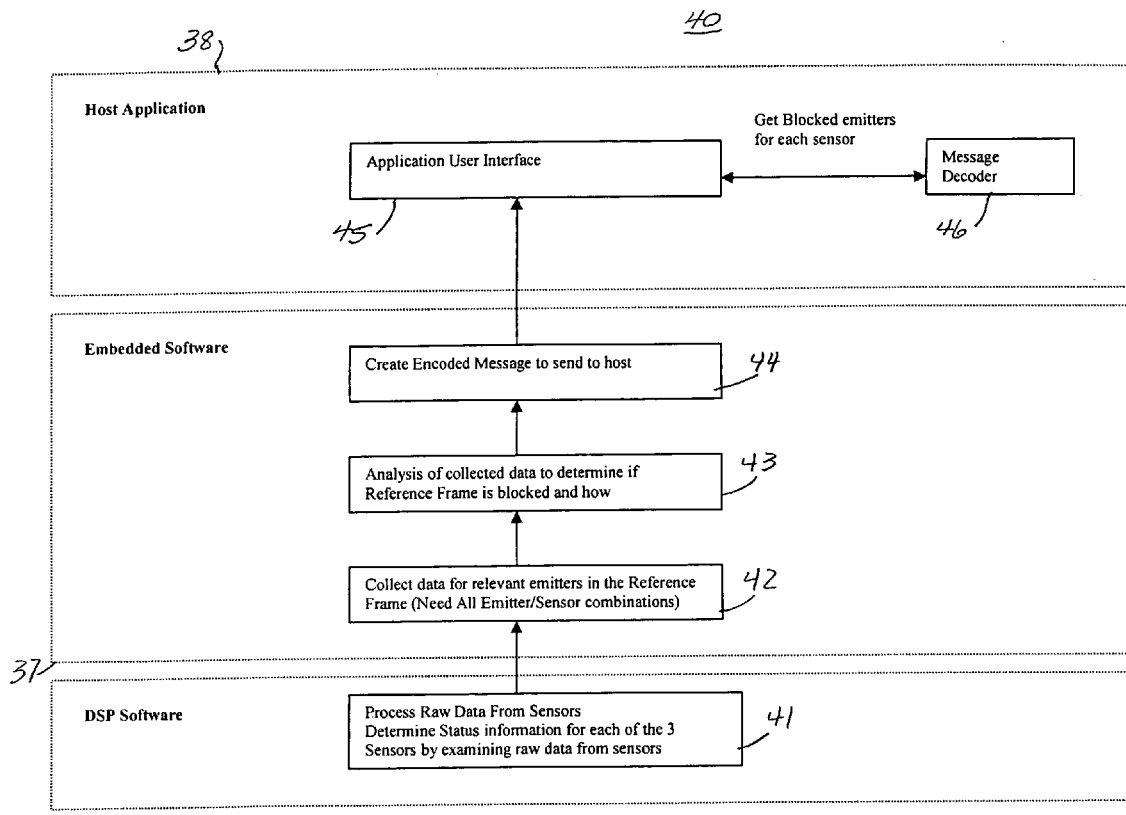
FIG. 5 is a flowchart diagram of a reference frame blocking diagnostic software routine for the system of FIG. 1.
Figure 6:
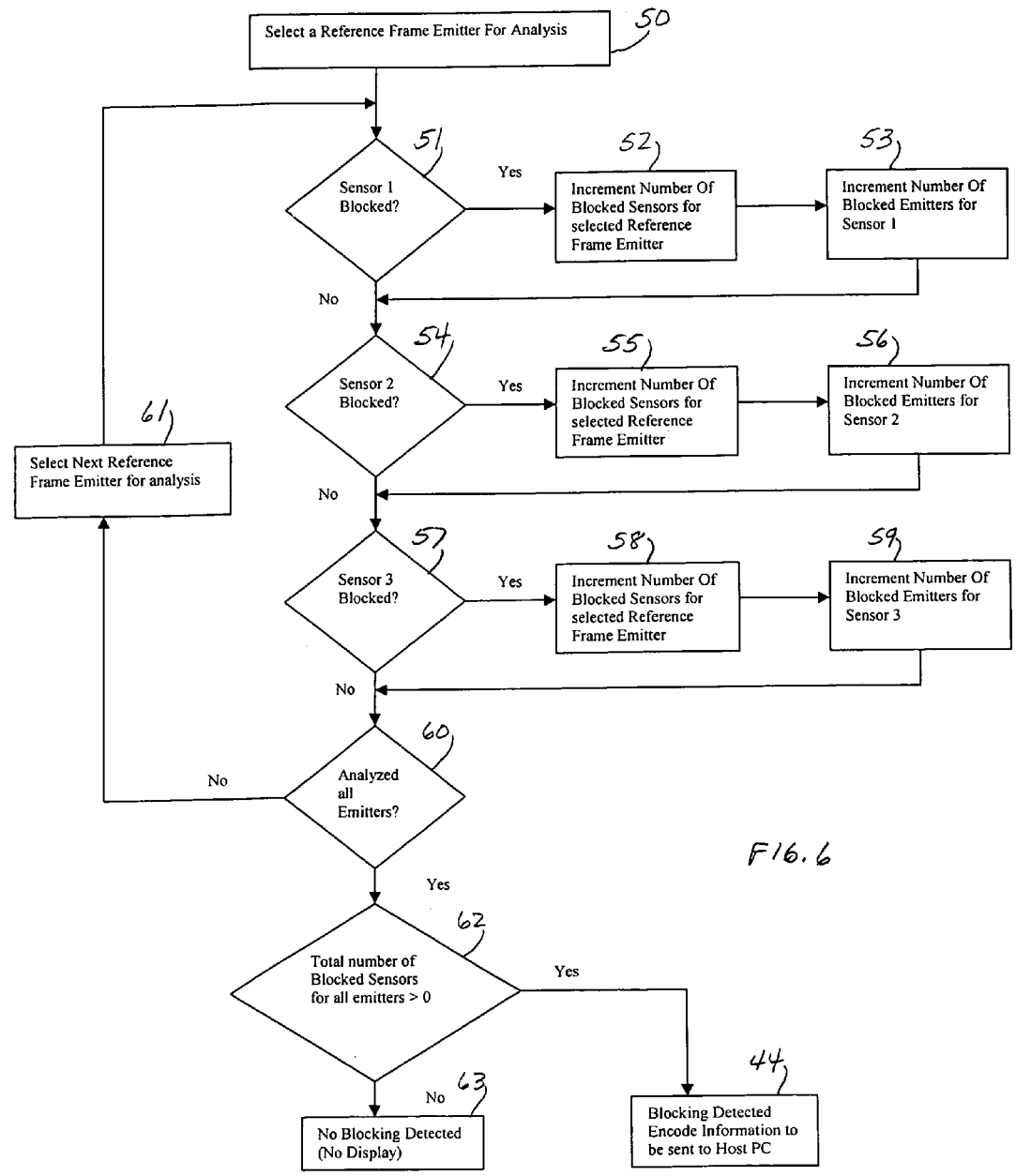
FIG. 6 is a more detailed flowchart diagram of the analysis block of the program routine of FIG. 5.

Referring now to FIGS. 5 and 6, the operation of the system 10 in connection with providing field-of-view information with respect to the reference frame sources 16, will be explained with reference to the software program routines controlling that operation. FIG. 5 indicates by dotted lines the portions of the software routines which are performed on the DSP board 32 (designated "DSP Software"), on the processor board 31 (designated "Embedded Software") and at the host computer 25 (designated "Host Application"). Initially, at 41, the DSP software processes the raw data from the receiver sensors 18, at the DSP application routines 34 and determines the status information for each of the three sensors by examining the raw data from the sensors. This information is communicated to the processor board 31, wherein the Embedded Software next, at 42, collects from the tool board 35 the data for the relevant emitters or sources 16 on the dynamic reference frame 15. In actual practice, the sources 16 will be sequentially operated and, during each operation, the Embedded Software at the processor board 31 will be determining whether or not that actuation is being sensed by each of the receiver sensors 18. Then, at 43, the Embedded Software performs an analysis of the collected data to determine if the line of sight between any sensor 18 and any source 16 is being blocked, i.e., whether any source is outside the field of view of any sensor and then, at 44, creates an encoded message containing this information. That encoded message is sent to the host computer 25 through a host application user interface 45, which interface includes the display 26. The message is forwarded to a decoder 46, which decodes it and returns it to the interface at 45 for display on the display screen 26.

The details of the analysis at 43 are set forth in FIG. 6. Initially, at 50, the routine selects a reference frame emitter or source for analysis and then, at 51, checks to see if, with respect to this source, a first one of the sensors 18 is blocked, i.e., is not sensing the source. If it is, the routine, at 52, increments the number of blocked sensors for this emitter or source by one and then, at 53 increments the number of blocked emitters for this sensor by one and then proceeds to 54 to check to see if a second one of the sensors 18 is blocked. If, at 51, the first sensor is not blocked, the routine proceeds directly to 54. If, at 54, the second sensor is blocked, the routine then proceeds to increment the number of blocked sensors at 55 and to increment the number of blocked emitters at 56 and then proceeds to 57 to check to see if the third sensor is blocked. Again, if at 54, the second sensor is not blocked, the routine proceeds directly to 57. If, at 57, the third sensor is blocked then, again, the routine proceeds at 58 and 59 to increment the number of blocked sensors and the number of blocked emitters and proceeds to 60 to check to see if all of the emitters have been analyzed. The routine proceeds directly to this step from 57 if the third sensor is not blocked. If all emitters have not yet been analyzed, the routine proceeds to 61 to select the next reference frame source or emitter for analysis and then returns to 51. When, at 60, all emitters have been analyzed, the routine then checks at 62 to see if the total number of blocked sensors for all emitters is greater than 0. If not, then, at 63, the routine notes that there is no blocking detected and no display is generated. If the total number of blocked sensors for all emitters is greater than 0, i.e., any sensor is blocked as to any emitter, then the routine proceeds to 44 (FIG. 5) to create a coded message to signal which sensors are blocked with respect to which emitters.

Figure 9A:
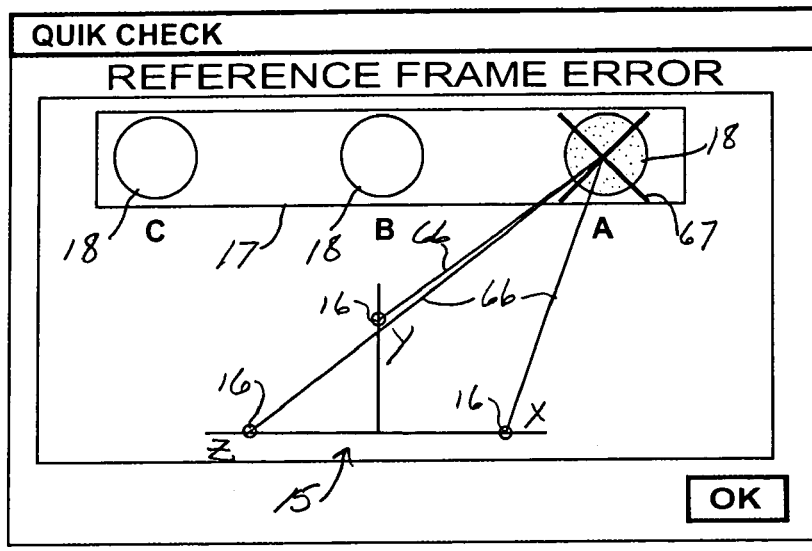
FIGS. 9A, 9B and 9C are views of graphic screen displays used in connection with the reference frame blocking software routine of FIG. 6.
Figure 9B:
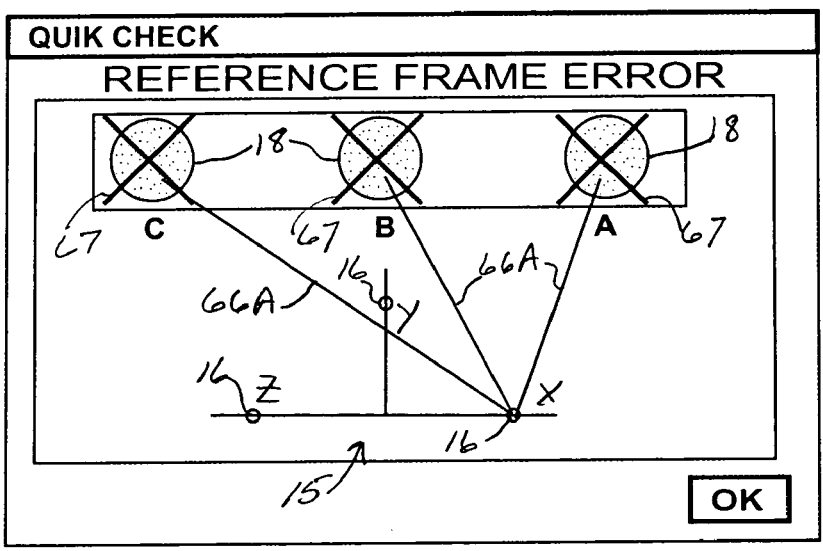
Figure 9C:
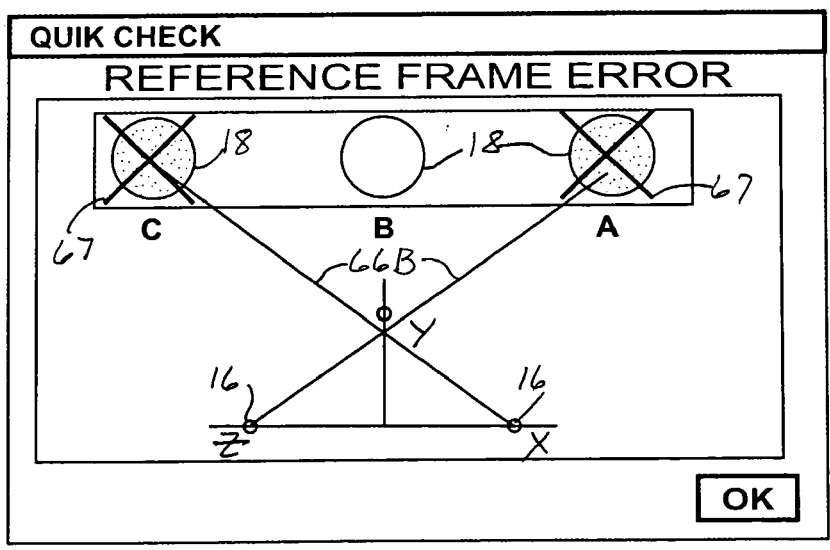

Referring now to FIGS. 9A–9C, the manner in which this information is conveyed to the user will be described. The program software generates on the screen of the display 26 a screen display image 65 (FIG. 9A) which graphically represents the reference frame 15 and its three sources 16, which are respectively designated "X", "Y" and "Z", and the receiver bar 17 and its three camera sensors 18, respectively designated "A", "B" and "C." The circles representing the three camera sensors 18 may be displayed in a predetermined color, such as green, as a default, indicating that the sensor is not blocked. In the situation illustrated in FIG. 9A, the sensor 18A is blocked as to all three sources 16 on the reference frame, i.e., it cannot "see" any of them. The fact that the sensor 18A is blocked as to any source is signified by its being displayed in a different color, e.g., red and having an "X" design 67 displayed across it. Also, a colored line 66 (e.g., red) is displayed as drawn between the blocked sensor 18 and each source 16 as to which it is blocked, in this case all three.

FIG. 9B shows another screen display 65A to indicate that one of the sources 16 on the reference frame ("X" in this case) cannot be seen by any of the sensors 18. In this case all three of the sensor icons will be displayed in red and will have the "X" lines 67 displayed thereacross to indicate that they are blocked relative to at least one source, and lines 66A will be displayed in red between the blocked source 16x and all three of the sensors 18.

FIG. 9C shows a screen display 65B for a situation in which one of the sources 16X cannot be seen by only one of the sensors 18C, while another source 16Z cannot be seen by only one of the sensors 18A. In this case the icon for the sensor 18B will be displayed in green, indicating that it can see all three sources, while those for the sensors 18A and 18C will be displayed in red and will have the lines 67 displayed thereacross to show that they are blocked with respect to at least one sensor, and the lines 66B will be displayed in red between these sensors and these sources with respect to which they are blocked.

Figure 7:
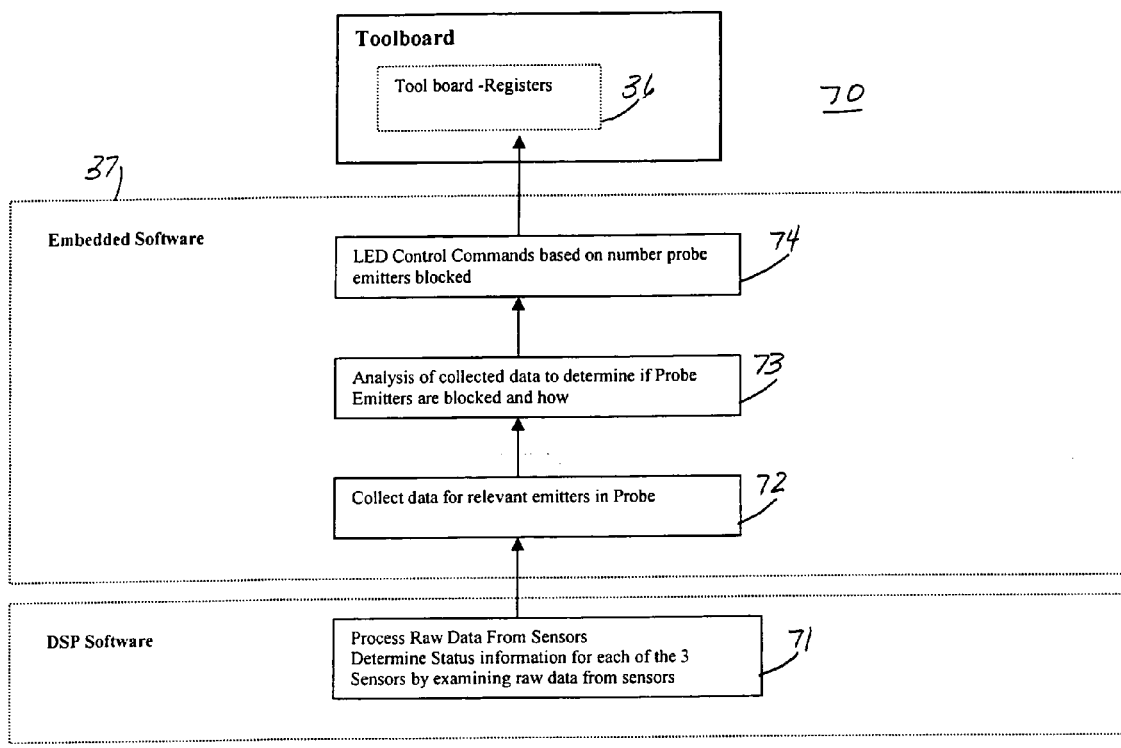
FIG. 7 is a flowchart diagram similar to FIG. 5 of the probe blocking diagnostic software routine for the system of FIG. 1.
Figure 8:
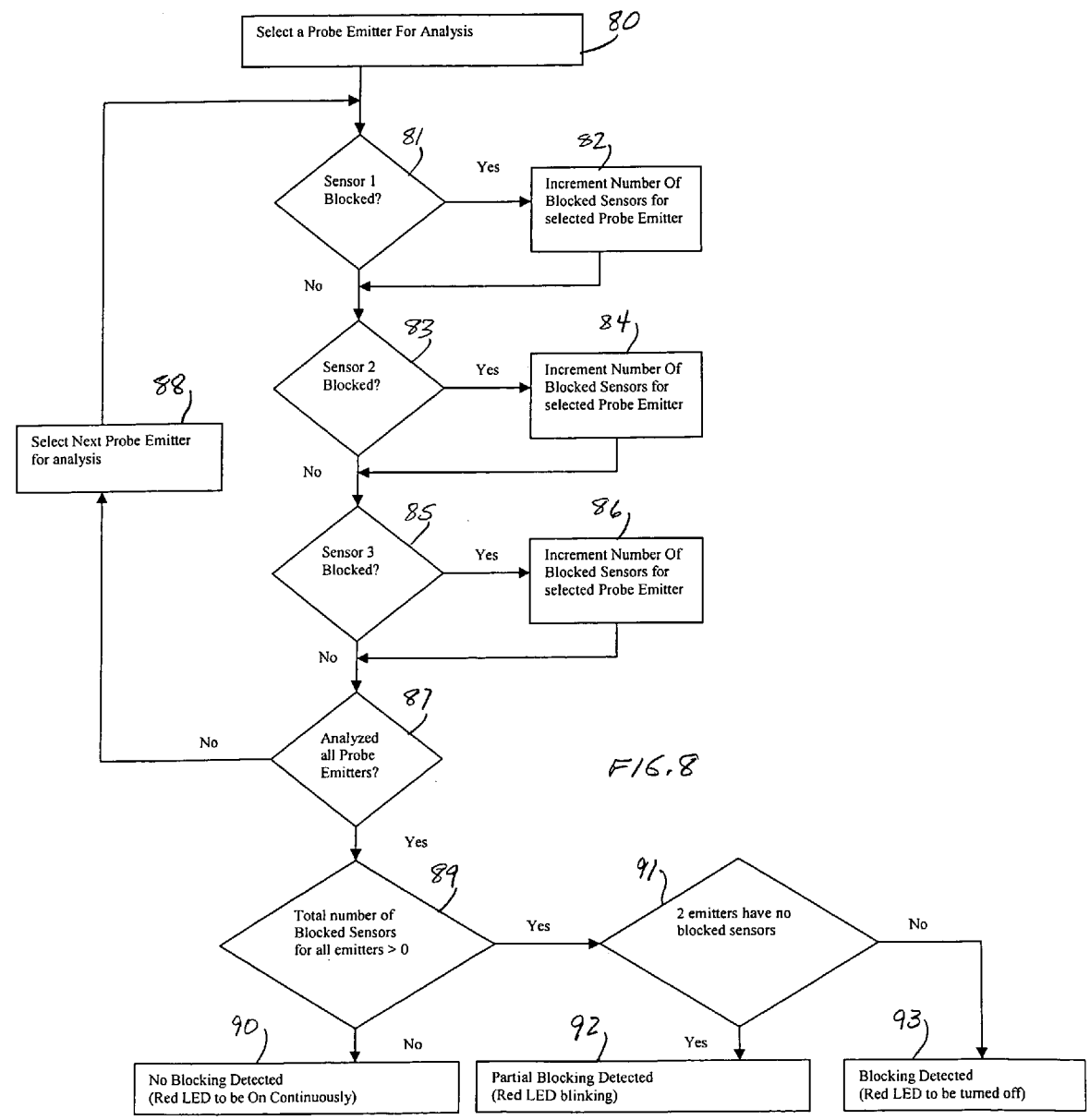
FIG. 8 is a more detailed flowchart diagram of the analysis block of the software routine of FIG. 7.

Referring now to FIGS. 7 and 8, the operation of the system 10 for indicating a blockage of the probe sources 21 will now be described. As shown in the software 70 of FIG. 7, at 71 the DSP software first processes the raw data from the camera sensors 18 and determines the status information for each of the three sensors by examining the raw data. Then, at 72 the Embedded Software at the processor board 31 collects the data for the relevant probe sources 21 and then, at 73, analyzes the collected data to determine if any of the probe sources is blocked and how. Then, at 74, LED control commands are generated based on the number of sensors and/or probe sources blocked and those commands are forwarded to the tool board registers 36 for transmission to the probe indicator 22.

The details of the analysis routine at 73 are set forth in FIG. 8. At 80, the routine selects a probe emitter or source 21 for analysis and then, at 81, checks to see if a first one of the sensors 18 is blocked with respect to the selected source. If so, the number of blocked sensors for the selected emitter is incremented at 82 and then the routine checks at 83 to see if a second one of the sensors is blocked with respect to the selected source. The routine proceeds directly from 81 to 83 if the first sensor is unblocked. If, at 83, the second sensor is blocked, the number of blocked sensors for the selected emitter is incremented at 84 and the routine then checks at 85 to see if a third sensor is blocked, the routine proceeding directly from 83 to 85 if the second sensor is unblocked. If the third sensor is blocked, the number of blocked sensors is incremented again at 86 and then the routine checks at 87 to see if all of the emitters or sources of the probe have been analyzed, the routine proceeding directly from 85 to 87 if the third sensor was unblocked. If all emitters have not been analyzed, the routine at 88 selects the next probe source 21 for analysis and returns to 81. If all sources have been checked at 87, the routine next checks at 89 to see if a total number of blocked sensors for all sources is greater than 0. If not, then there is no blocking detected and the routine at 90 generates a signal for controlling the probe indicator 22, which may be a red LED, to be continuously on. If, at 89, the number of blocked sensors for all emitters is greater than 0, indicating that at least one sensor is blocked with respect to at least one source, the routine then checks at 91 to see if there are two emitters which have no blocked sensors, i.e., there is blockage with respect to only one emitter. If so, this constitutes a partial blocking condition and the routine, at 92, controls the probe indicator 22 to operate in a blinking or intermittently-on condition. If, at 91, there are not two emitters having no blocked sensors, i.e., more than one emitter is blocked, the routine then, at 93, interprets this as a complete blockage and turns off the probe indicator 22.

Note that the above-described blockage indication routine is operable whether or not the operator is attempting to take a measurement reading. Thus, when the operator has the probe 20 in position for a reading he can immediately determine, before attempting the reading, whether or not there is any blockage and then attend to it before taking a reading. As was described above, the system 10 also operates in response to actuation of the reading or measurement switch 23 on the probe 20 to momentarily illuminate the indicator 22 to signify that the reading was successful.

While, in the above-described system 10, there are three dynamic reference frame sources 16, three camera sensors 18 and three probe sources 21, it will be appreciated that other numbers of these items could be utilized, as long as there are sufficient source/sensor combinations to effect position-determining triangulation. Also, it will be understood that the specific display colors described above are simply for purposes of illustration and other color schemes could be utilized. Also, while the system 10 is described in the context of performing measurements with respect to an automotive vehicle, it will be appreciated that it could be used for other types of objects.

From the foregoing, it can be seen that there has been provided an improved measurement system and, in particular, a field-of-view blockage indicating technique which provides an operator with a simple and easily understood indication of the condition of blockage or lack thereof between sources and sensors.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A system for measuring the relative locations of points on a vehicle, comprising:
   plural electromagnetic radiation sources adapted to be fixed relative to the vehicle,
   plural electromagnetic radiation receivers at a receiving location,
   a processor coupled to the sources and to the receivers and operating under control of a stored program for determining angles between each receiver and each source which is in the field of view of the receiver, and
   a display device coupled to the processor,
   the processor program including a routine for monitoring each receiver and generating on the display device a graphical display indicating for each source and each receiver whether or not the source is in the field of view of the receiver.

2. The system of claim 1, wherein the system includes at least three sources and at least three receivers.

3. The system of claim 1, wherein the sources are fixed relative to each other.

4. The system of claim 1, wherein the sources are LED's and the receivers are camera sensors.

5. The system of claim 1, wherein the graphical display includes representations of the sources and the receivers.

6. The system of claim 5, wherein the graphical display includes for each receiver a line drawn between that receiver and each source which is outside its field of view.

7. The system of claim 5, wherein the graphical display includes color-coded indications of whether or not a depicted receiver can see all sources.

8. A system for measuring the relative locations of points on a vehicle, comprising: at least one electromagnetic radiation source disposed on a hand-held probe,
plural electromagnetic radiation receivers at a receiving location,
a processor coupled to the probe and to the receivers and operating under control of a stored program for determining angles between the source and each receiver which has the source in its field of view, and
an indicator on the hand-held probe,
the processor program including a routine for monitoring each receiver and causing the indicator to operate in a first mode if the source is in the field of view of all of the receivers and in a second mode if the source is in the field of view of all but one of the receivers.

9. The system of claim 8 wherein the first mode is a steadily on mode and the second mode is an intermittently on mode.

10. The system of claim 9 wherein the indicator is steadily off if the source is outside the field of view of more than one receiver.

11. The system of claim 8, wherein the at least one source includes plural sources.

12. The system of claim 11, wherein the indicator operates in the first mode if all sources are in the field of view of all receivers and in the second mode if no more than one source is outside the field of view of any receiver.

13. The system of claim 8, wherein the at least one source is an LED and each receiver is a camera sensor.

14. The system of claim 8, wherein the indicator is an optical indicator.

15. The system of claim 8, wherein the hand-held probe has associated therewith a switch to activate a measurement of the position of the probe, the program routine being responsive to actuation of the switch to momentarily turn the indicator on if the probe location is successfully measured.

16. A system for measuring the relative locations of points on a vehicle, comprising:
plural first electromagnetic radiation sources adapted to be fixed relative to the vehicle, at least one second electromagnetic radiation source on a hand-held probe,
plural electromagnetic radiation receivers at a receiving locations,
a processor coupled to the probe and to the sources and to the receivers and operating under control of a stored program for determining angles between each receiver and each source which is in the field of view of the receiver,
a display device coupled to the processor, and
an indicator on the hand-held probe,
the processor program including a first routine for monitoring each receiver and generating on the display device a graphical display indicating for each first source and each receiver whether or not the first source is in the field of view of the receiver,
the processor program including a second routine for monitoring each receiver and causing the indicator to operate in a first mode if the at least one second source is in the field of view of all of the receivers and in a second mode of the at least one second source is in the field of view of all but one of the receivers.

17. The system of claim 16, wherein the first and second sources are LED's and the receivers are camera sensors.

18. The system of claim 16, wherein the first sources are fixed relative to one another.

19. The system of claim 16, wherein the second sources are fixed relative to one another.

20. The system of claim 16, wherein the graphical display includes representations of the first sources and the receivers.

21. The system of claim 20, wherein the graphical display includes for each receiver a line drawn between that receiver and each first source which is outside its field of view.

22. The system of claim 16, wherein the first mode is a steadily on mode and the second mode is an intermittently on mode.

23. The system of claim 16, wherein the indicator is an optical indicator.

24. A method of measuring the relative locations of points on a vehicle comprising:
determining angles between each of plural electromagnetic radiation receivers and each of plural electromagnetic radiation sources which is in the field of view of the receiver,
monitoring each receiver to determine which sources are in its field of view, and
providing an indication as to whether or not any source is outside the field of view of any receiver and, if so, identifying which source or sources and which receiver or receivers.

25. The method of claim 24, wherein the providing step includes providing a graphical display indicating for each source and each receiver whether or not the source is in the field of view of the receiver.

26. The method of claim 25, wherein the graphical display includes for each receiver a line drawn between that receiver and each source which is outside its field of view.

27. The method of claim 24, and further comprising providing a hand-held probe including at least one second electromagnetic radiation source, and providing in association with the probe an indication as to whether or not the at least one second source is in the field of view of all of the receivers.

28. The method of claim 27, wherein the providing of an indication at the hand-held probe, includes operating an indicator in a first mode if the at least one second source is in the field of view of all of the receivers and in a second mode if the at least one second source is in the field of view of all but one of the receivers.

* * * * *